United States Patent

[11] 3,623,036

[72] Inventors Donald F. Taylor;
Alan Jones; Bryan L. H. Wilson, all of Ilford, England
[21] Appl. No. 853,273
[22] Filed Aug. 27, 1969
[45] Patented Nov. 23, 1971
[73] Assignee The Plessey Company Limited
Ilford, England

[54] DATA STORAGE ARRANGEMENTS
9 Claims, 4 Drawing Figs.

[52] U.S. Cl. .......... 340/173 LS
[51] Int. Cl. .......... G11c 5/02, G11c 11/36, G11c 11/42
[50] Field of Search .......... 340/173 LS

[56] References Cited
UNITED STATES PATENTS

| | | | |
|---|---|---|---|
| 2,942,120 | 6/1960 | Kazan | 340/173 X |
| 3,361,988 | 1/1968 | Chynoweth | 340/173 X |
| 3,499,158 | 3/1970 | Lavine et al. | 340/173 X |
| 3,543,248 | 11/1970 | Oliver | 340/173 LS |
| 3,550,095 | 12/1970 | Kohashi | 340/173 LS |

*Primary Examiner*—Stanley M. Urynowicz, Jr.
*Attorney*—Mason, Mason & Albright

ABSTRACT: A data storage arrangement is disclosed comprising a plurality of PN diodes fabricated from gallium arsenide or similar material such that each device has a low-voltage/high-current operating state and a low-current/high-voltage operating state and is capable of producing an electroluminescent output only when in the low-voltage/high-current state. The devices are electrically connected in parallel between a power supply which sustains them in their particular states. Coordinate-fashion control connections enable any selected device to be energized so as to switch it into a particular one of its two states according to the data to be stored. Data is read out from any device by momentarily energizing the control connections of that device with a relatively high voltage. If the device is in the low-voltage/high-current state, an electroluminescent output will be produced, but not if the device is in the other state.

INVENTORS
DONALD F. TAYLOR
ALAN JONES
BRYON L. H. WILSON
BY Mason, Mason & Albright
ATTORNEY INVENTORS
DONALD F. TAYLOR
ALAN JONES
MILTON L. H. WILSON
BY
Mason, Mason & Albright
ATTORNEY

DATA STORAGE ARRANGEMENTS

BRIEF SUMMARY OF THE INVENTION

The invention relates to storage or memory arrangements for storing data or information.

According to the invention, there is provided a data storage arrangement, comprising a device having a plurality of possible electrical operating states and operable to produce an electroluminescent output when in one only of its states.

According to the invention, there is also provided a data storage arrangement, comprising a plurality of bipolar semiconductor memory devices each having a low-voltage/high-current operating state and a low-current/high-voltage operating state into which it can be switched and each capable of producing an electroluminescent output when sufficient current flows therethrough, a plurality of electrical control connections so connected to the devices that the circuit through any selected one of a plurality of predetermined pairs of control connections includes only one of the devices, means operative to electrically energize all the devices in parallel to sustain each device in the particular state into which it has been switched, and means operative to energize any selected pair of control connections to cause the device in circuit therewith to produce an electroluminescent output if it is in the low-voltage/high-current state.

BRIEF DESCRIPTION OF THE DRAWINGS

A data storage arrangement embodying the invention will now be described, by way of example only, with reference to the accompanying drawings in which.

DETAILED DESCRIPTION

The data storage arrangement to be described comprises a plurality of memory elements each having two possible states of operation in one only of which a light output can be produced.

Figures 1, 4:
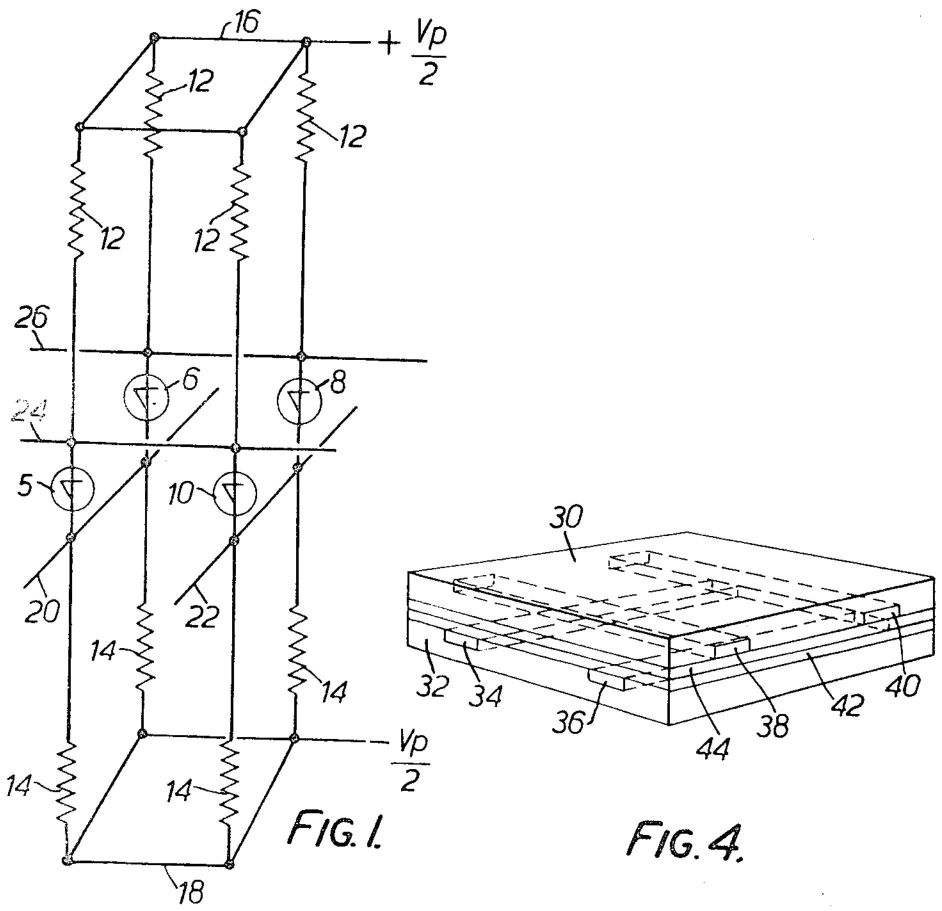
FIG. 1 is a circuit diagram of part of the arrangement.
FIG. 4 is a perspective diagrammatic view of a physical form of part of the arrangement.

FIG. 1 shows a matrix of four such memory elements 5, 6, 8, 10 each comprising a PN—PN four-layer diode fabricated in an electroluminescent material such as gallium arsenide. The four memory elements are connected in parallel, through respective resistors 12 and 14, between two supply lines 16 and 18. The operation of the memory matrix is controlled by control lines 20, 22, 24 and 26 which are arranged in coordinate fashion. Thus, each of the parallel circuits, comprising one of the diodes 5 to 10 and a respective pair of resistors 12 and 14, is connected to one of the pair of control lines 20 and 22 and to one of the pair of control lines 24 and 26.

Figure 2:
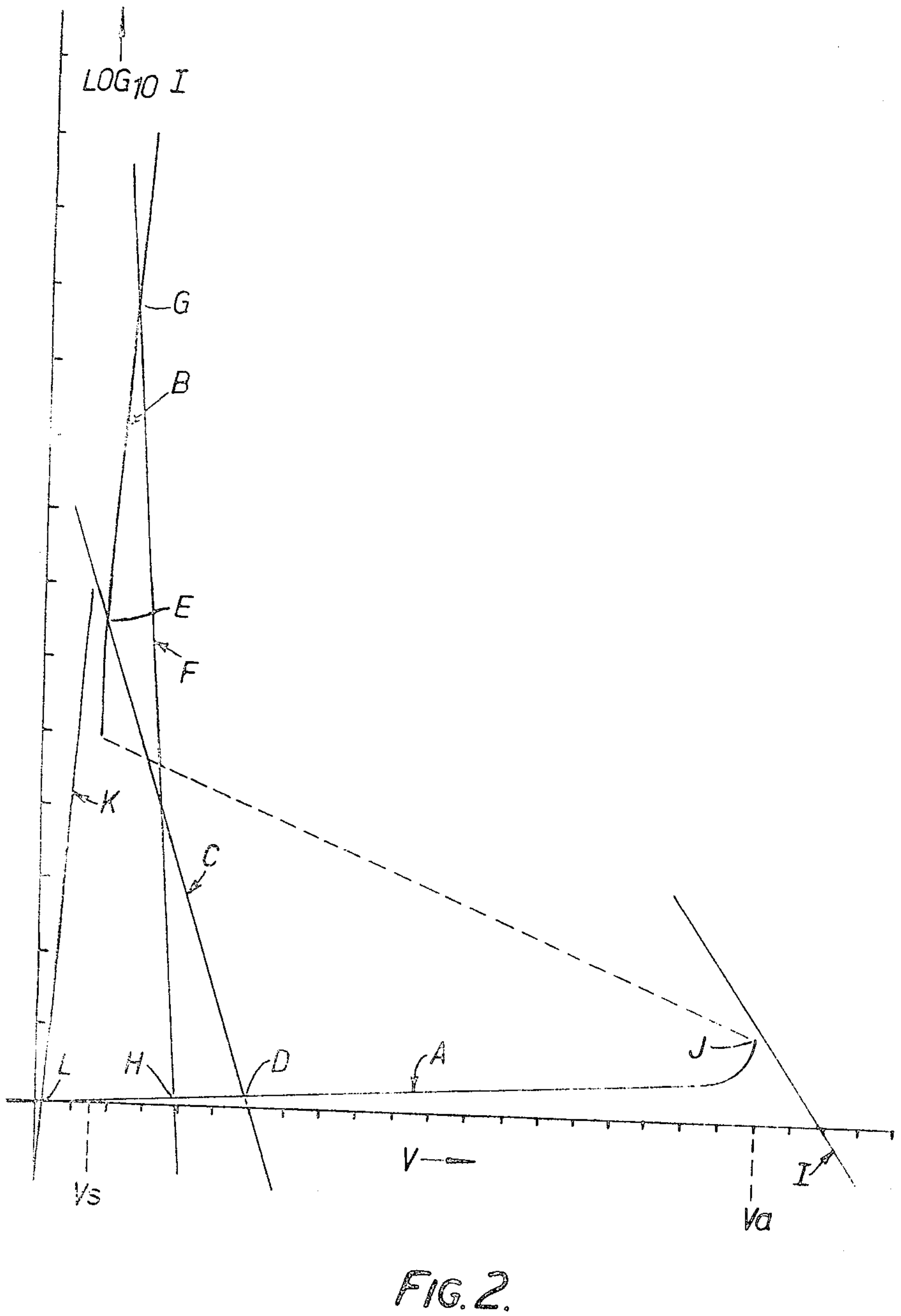
FIG. 2 shows the voltage/current characteristic of an element used in the arrangement.

The operation of the data storage arrangement will now be described with reference to FIG. 2 which shows the voltage/current characteristic of one of the memory elements 5 to 10. As shown in FIG. 2, the element can operate either on a low-current portion A of the characteristic or on a low-voltage portion B, and the memory element is in a stable state when operating on either of these portions of the characteristic. In operation, the memory element is sustained in one of these two stable states by a sustaining supply applied by means of the lines 16 and 18, which supply establishes a loadline C. Thus, the memory element is either sustained at a point D on the portion A of the characteristic or at a point E on portion B of the characteristic. The precise position of the leadline C for each diode will be a function of the condition of the total matrix so that considerable variation can occur in the actual voltage sustained across the diode or in the actual current flowing through the diode.

In order to read the memory element, the appropriate lines (lines 20 and 24, FIG. 1, in the case of diode 5 for example) are coincidentally energized with opposite polarity so as to drive a current through the diode and thereby establish a transient loadline F. If, therefore, the diode is operating on the portion B of the characteristic, its operating point will momentarily shift along the portion B from point E to point G, and at the latter point the diode becomes strongly luminescent. If, however, the diode is operating on the low-current portion A of the characteristic it will shift from point D to point H both of which are nonluminescent. Therefore, the diode can only be energized to produce a light output when it is operating in one of its two stable states. This light output can be detected by any suitable light sensing means which can be arranged to respond either to the light output from only one of the diodes or the to the light output from a whole group or matrix of the diodes, according to the physical size of the memory. If the light-sensing means is arranged to respond to light from any one of a plurality of the diodes, then only one of these diodes can be read at any given time.

In order to write information of one binary type into the memory element, the appropriate control lines (lines 20 and 24 in the case of diode 5, for example) are energized to establish a transient loadline I. If the diode is operating at the low-current point D, it will shift to point J and then trigger to the portion B of the characteristic where it will stabilize at point E when the writing signal is removed. If the diode is already operating at the low-voltage point E, it will be unaffected by the writing operation.

In order to write data of the other binary type into the memory element or to erase information from the memory element, the appropriate control lines (lines 20 and 24 in the case of diode 5, for example) are energized coincidentally with opposite polarity to establish a transient loadline K for which the device can only operate on the low-current portion A of the characteristic and is thus switched to the point L from which it shifts to point D when the erasing signal is removed.

Figure 3:
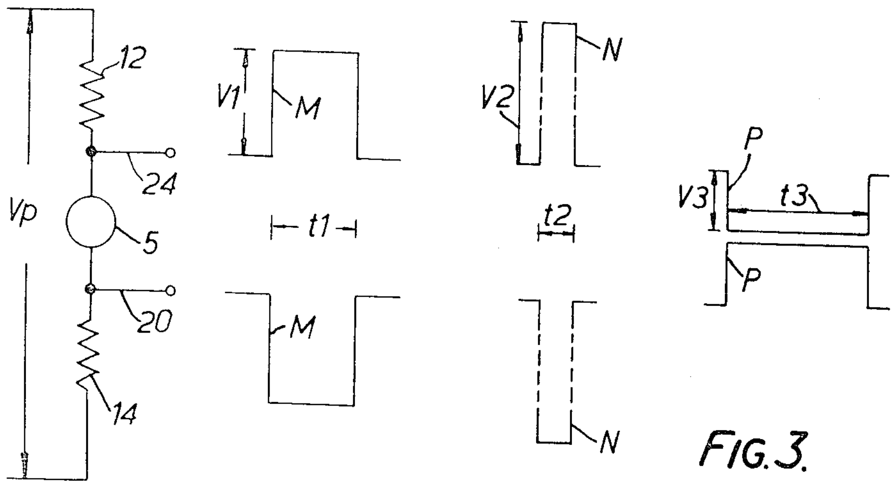
FIG. 3 shows waveform supplied to the arrangement.

FIG. 3 shows the waveforms of the voltages applied to the control lines 20 and 24 to establish the read loadline F, the write loadline I, and the erase loadline K for the diode 5. It is assumed that the sustaining loadline C is maintained by a voltage $Vp$ applied between lines 16 and 18 and that $Vs$ is the minimum sustaining voltage across the diode as indicated in FIG. 2. It is also assumed that $Va$ is the voltage at the triggering point between the two portions A and B of the characteristic as indicated in FIG. 2.

The read loadline F is established by the application of coincident voltage pulses M, of opposite polarity, to the control lines 20 and 24, each pulse M having a magnitude of $V1$ and a duration of $t1$. The duration $t1$ should approach the minority carrier lifetime of the diode in order to allow adequate modulation of the base resistance and to obtain adequate carrier injection. Preferably, the value of $V1$ is such that the following relationship obtains:

$$\frac{Vs}{2} \leqslant V1 < \frac{Vp - Vs}{2}$$

The write load line I is established by the application of coincident pulses N, of opposite polarity, to the control lines 20 and 24, each pulse N having a magnitude of $V2$ and a duration of $t2$. The duration $t2$ can be very short indeed (very much less than the minority carrier lifetime), its lower limit being governed by the R—C time constant of the junction capacitance and the unmodulated base resistances. Preferably, the value of $V2$ is such that the following relationship obtains:

$$\frac{Va}{2} < V2 \ll Vp$$

The erase load line K is established by the application of coincident pulses P, of opposite polarity, to the control lines 20 and 24, each pulse having a magnitude of $V3$ and a duration of $t3$. The duration $t3$ is approximately the same as the minority carrier lifetime. Preferably, the magnitude $V3$ is such that the following relationship obtains:

$$\frac{Vs}{2} \leqslant V3 \ll \frac{Vp - Vs}{2}$$

A memory arrangement as described may be constructed in discrete form or in integrated form. FIG. 4 shows, diagrammatically, an integrated form of the matrix shown in FIG. 1.

The matrix (FIG. 4) comprises an intrinsic epitaxial P-type layer 30 and an intrinsic N-type base 32 both of which have conductive surface coatings applied to them to which the lines 16 and 18 (FIG. 1) can be attached; the conductive coatings provide the resistors 12 and 14 (FIG. 1). The layer 30 is transparent to allow the light output to pass. Two N+ emitter stripes 34 and 36 are embedded in the base 32 and two P+ emitter stripes 38 and 40 are embedded in the layer 30. The stripes 34 and 36 form junctions with a continuous sheet of epitaxial P-type material 42 while the stripes 38 and 40 form junctions with a continuous sheet of epitaxial N-type material 44. The stripes 34, 36, 38 and 40 are connected to the appropriate ones of the control lines 20 to 26 (FIG. 1). The N-type base 32 can be used to form an earth plane.

In a particular embodiment of the invention, a memory arrangement constructed in integrated form in the manner of FIG. 4 could comprise 10-micron square diodes pitched on a 50-micron matrix. The diodes of the matrix should not be arranged so close together that one of two diodes connected to the same one of the control lines 20 to 26 can be switched from one stable state to the other state by photon-induced minority carrier generation when electroluminescence occurs in the other diode.

Instead of using PN—PN diodes as the memory elements, other types of semiconductor elements, such as PIN diodes for example, having the property of electroluminescence can be used. In general, it will be desirable to construct all the circuit elements, except the light output diode, from unipolar devices.

By using optical readout, the memory arrangement described ensures that the output is free from stray capacitive coupling with the write, read and erase conductors. Furthermore, the optical readout effectively converts each two-terminal diode into a three-terminal device during the readout process and thus allows each diode to be read individually by coordinate selection, as described, as well as by word selection readout.

What is claimed is:

1. A data storage arrangement, comprising a memory device having two possible electrical operating states between which it can be switched and capable of producing an electroluminescent output when in one only of its states, the first such state being a state in which the maximum current flowing through the device is substantially lower than in the second stable state, data write-in means electrically connected in circuit with the device and momentarily energizing the device, in response to data of one type to be stored, with a voltage sufficient to switch the device from the first stable state to the second stable state, and momentarily establishing, in response to data of another type to be stored, a voltage/current relationship across the device such as to switch the device from the second stable state to the first stable state, electrical sustaining means connected in circuit with the device and energizing the device with a voltage/current combination sufficient to sustain it in the particular one of its two states into which it has been switched, and readout means electrically connected in circuit with the device to energize the device with a voltage which is only sufficient to produce the said electroluminescent output if the device is in the second state.

2. A data storage arrangement, comprising a memory device having a first, high-voltage/low-current electrical operation state and a second, low-voltage/high-current electrical operating state and capable of producing an electroluminescent output only when its current is above a predetermined level which is higher than the minimum current for the said second state, data write-in means electrically connected in circuit with the device and momentarily electrically energizing the device with a voltage/current combination such as will switch it into a particular one of its stable states according to the data to be stored, electrical sustaining means connected in circuit with the device and energizing the device with a particular voltage/current combination as will sustain it in the particular one of its operating stages into which it has been switched, with the sustained current less than the said predetermined level, and readout means electrically connected in circuit with the device for electrically energizing the device with a voltage which is only sufficient to raise the current through the device above the predetermined current level, and thus to produce the electroluminescent output, if the device is in its said second state.

3. An arrangement according to claim 2, in which the device comprises a PN diode fabricated from an electroluminescent material.

4. An arrangement according to claim 2, including light responsive means mounted to sense the electroluminescent output.

5. A data storage arrangement, including a plurality of memory devices, each device comprising a bipolar semiconductor memory element having a low-voltage/high-current operating state and a low-current/high-voltage operating state and each producing an electroluminescent output only when sufficient current flows therethrough, means connecting the elements electrically in parallel and electrically energizing the parallel-connected elements such as to sustain each element in the particular one of its states into which it has been switched, a plurality of electrical control connections connected to the elements in coordinate fashion whereby the circuit through any selected one of a predetermined plurality of pairs of the control connections includes only one of the elements, data write-in means responsive to data to be stored and energizing any selected one of the said pairs of control connections with a voltage/current combination such as to switch the element in circuit therewith into one of its operating states according to the data to be stored, and readout means responsive to a readout signal to energize any selected one of the said pairs of electrical control connections to cause the element in circuit therewith to produce an electroluminescent output only if it is in the low-voltage/high-current state.

6. An arrangement according to claim 5, in which the data write-in means comprises means responsive to data of one type to be stored and momentarily energizing any selected one of the said pairs of control connections with a voltage sufficiently in excess of the sustaining voltage to cause the element in circuit with the selected pair of control connections to switch from the low-current/high-voltage operating state to the low-voltage/high-current operating state, and means responsive to data of another type to be stored and momentarily electrically energizing any selected one of the said pairs of control connections with a voltage which is less than the sustaining voltage such as to cause the element connected in circuit with the selected pair of control connections to switch from the low-voltage/high-current operating state to the low-current/high-voltage operating state.

7. An arrangement according to claim 6, in which each memory element comprises a PN diode fabricated from an electroluminescent material.

8. An arrangement according to claim 7, in which the electroluminescent material is gallium arsenide.

9. An arrangement according to claim 7, when constructed in integrated circuit form.